Patented Apr. 29, 1924.

1,492,299

UNITED STATES PATENT OFFICE.

KARL J. KYLE, JOHN A. BINFORD, AND JOHN T. WADDELL, OF WELLSVILLE, KANSAS.

TOOTH-PASTE COMPOSITION.

No Drawing. Application filed February 3, 1923. Serial No. 616,822.

*To all whom it may concern:*

Be it known that KARL J. KYLE, JOHN A. BINFORD, and JOHN T. WADDELL, citizens of the United States, residing at Wellsville, in the county of Franklin and State of Kansas, have invented certain new and useful Improvements in Tooth-Paste Composition, of which the following is a specification.

This invention has as its object to provide a novel tooth paste composition which will not only be useful in cleansing the teeth and gums, but will also prove highly efficient in the treatment of pyorrhea.

The paste composition embodying the invention consists of an intimate mixture of the following ingredients in substantially the proportions stated:

| | |
|---|---|
| Precipitated chalk | 3 ounces. |
| Magnesium carbonate | 1⅛ ounces. |
| Tincture of hydrastis | 31 minims. |
| Beechwood creosote | 3 minims. |
| Menthol | 5 grains. |
| Alcohol q. s. to dissolve menthol. | |
| Glycerine | 3½ ounces. |
| Methyl salicylate | 10 minims. |
| Oil of peppermint | 3 minims. |

In preparing the composition, the chalk and magnesia are thoroughly triturated, and the glycerine is added while the mixture is continually stirred and until it is of uniform consistency throughout. The menthol is then mixed with alcohol in quantity sufficient to dissolve, and this solution, together with the other liquid ingredients of the menstruum, are added and the trituration is continued until a smooth paste of uniform consistency is obtained.

The precipitated chalk and magnesium carbonate serve to neutralize the acids in the mouth, and the precipitated chalk serves the further purpose of a gentle abradant. Tincture of hydrastis acts as an astringent and a stimulant, and the creosote acts as an antiseptic and also possesses analgesic properties. The glycerine, methyl salicylate and oil of peppermint act as an antiseptic and also impart an agreeable flavor to the composition.

Having thus described the invention, what is claimed as new is:

1. A tooth paste composition comprising a mixture of a gentle abradant, magnesium carbonate, tincture of hydrastis, creosote, menthol, glycerine, and methyl salicylate.

2. A tooth paste composition comprising a mixture of the following ingredients in about the proportions stated: precipitated chalk 3 ounces; magnesium carbonate 1⅛ ounces; tincture of hydrastis 31 minims; beechwood creosote 3 minims; menthol 5 grains; alcohol q. s. to dissolve menthol; glycerine 3½ ounces; methyl salicylate 10 minims, and oil of peppermint 3 minims.

In testimony whereof we affix our signatures.

KARL J. KYLE. [L. S.]
JOHN A. BINFORD. [L. S.]
JOHN T. WADDELL. [L. S.]